United States Patent
Yamagata (10) Patent No.: US 8,515,608 B2
(45) Date of Patent: Aug. 20, 2013

(54) ENGINE START CONTROL DEVICE, HYBRID VEHICLE AND ENGINE START METHOD, AND COMPUTER PROGRAM

(75) Inventor: Keita Yamagata, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 13/813,095

(22) PCT Filed: Oct. 20, 2011

(86) PCT No.: PCT/JP2011/074175
§ 371 (c)(1),
(2), (4) Date: Jan. 29, 2013

(87) PCT Pub. No.: WO2012/053601
PCT Pub. Date: Apr. 26, 2012

(65) Prior Publication Data
US 2013/0131902 A1    May 23, 2013

(30) Foreign Application Priority Data

Oct. 21, 2010  (JP) ................................. 2010-236610
Jan. 24, 2011  (JP) ................................. 2011-012261

(51) Int. Cl.
*G06F 17/00*       (2006.01)

(52) U.S. Cl.
USPC .................. 701/22; 60/790; 60/602; 60/286; 60/481; 60/353; 123/491; 123/640; 318/139; 180/165; 192/96; 415/157

(58) Field of Classification Search
USPC .................. 701/22; 60/790, 602, 286, 481; 60/353, 303; 123/491, 179.3, 640; 318/139; 180/165; 192/96; 415/157
See application file for complete search history.

(56) References Cited

U.S. PATENT DOCUMENTS

| | | | |
|---|---|---|---|
| 7,228,209 B2 * | 6/2007 | Izawa et al. | 701/22 |
| 2009/0271057 A1 * | 10/2009 | Stone | 701/22 |
| 2013/0131901 A1 * | 5/2013 | Yamagata et al. | 701/22 |
| 2013/0131903 A1 * | 5/2013 | Araki | 701/22 |
| 2013/0138286 A1 * | 5/2013 | Sawayama | 701/22 |

FOREIGN PATENT DOCUMENTS

| | | |
|---|---|---|
| JP | 2000-205003 A | 7/2000 |
| JP | 2004-028008 A | 1/2004 |
| JP | 2004-028010 A | 1/2004 |

OTHER PUBLICATIONS

The above references were cited in the International Search Report of the corresponding International Application, PCT/JP2011/074175 dated Nov. 15, 2011.

* cited by examiner

*Primary Examiner* — McDieunel Marc
(74) *Attorney, Agent, or Firm* — Cowan, Liebowitz & Latman, P.C.; Mark Montague (57) ABSTRACT

A reduce electric power consumption when an electric motor starts an engine and the time required to start the engine. Engine start control is implemented as follows. The RPM of the engine is increased to an RPM (R1) by the electric motor. Fuel is supplied to the engine of which RPM has reached to the RPM (R1) and further increases in the RPM are detected. If a further increase in the RPM is not detected, the supply of electric power to the electric motor is temporarily stopped. If the RPM has decreased to a RPM (R2), the supply of fuel to the engine is interrupted and also the supply of electric power to the electric motor is resumed. If a further increase in the RPM is detected or if the RPM has not decreased to the RPM (R2), it is determined that the engine has been started.

8 Claims, 12 Drawing Sheets

ENGINE START CONTROL DEVICE, HYBRID VEHICLE AND ENGINE START METHOD, AND COMPUTER PROGRAM

CROSS REFERENCE TO RELATED APPLICATIONS

This is a U.S. national stage of application No. PCT/JP2011/074175, filed on Oct. 20, 2011. Priority under 35 U.S.C. §119(a) and 35 U.S.C. §365(b) is claimed from Japanese Patent Applications No. 2010-236610 filed on Oct. 21, 2010 and No. 2011-012261 filed on Jan. 24, 2011, the disclosures of which are also incorporated herein by reference.

TECHNICAL FIELD

The present invention relates to an engine start control device, a hybrid vehicle and an engine start method, and a computer program.

BACKGROUND ART

In a hybrid vehicle that has an engine and an electric motor and that is capable of running by the engine or the electric motor, or is capable of running by the cooperation between the engine and the electric motor, the electric motor can start the engine (for example, see Patent Literature PTL1).

CITATION LIST

Patent Literature

PTL1: JP 2002-309982 A

SUMMARY OF INVENTION

Technical Problem

As for a hybrid vehicle in prior art, when the electric motor starts the engine, it takes more than enough time to start the engine in order to avoid the stop of the engine due to misfire. This causes large electric power consumption for continuing to rotate the engine and increases the time required to start the engine.

Further, if the engine start is unsuccessful, it is necessary to perform the start again from an engine shutdown state. This causes large electric power consumption in order to start the engine from a zero rotation state.

In light of the foregoing, an objective of the present invention is to provide an engine start control device, a hybrid vehicle and an engine start method, and a computer program that are capable of reducing the electric power consumption when the electric motor starts the engine, and reducing the time required to start the engine.

Solution to Problem

An aspect of the present invention is an engine start control device. The engine start control device of the present invention is an engine start control device of a hybrid vehicle that includes an engine and an electric motor, that is capable of running by the engine or the electric motor or capable of running by a cooperation between the engine and the electric motor, and that starts the engine by the electric motor, wherein a series of controls is repeatedly performed and the series of controls includes increasing a rotational speed of the engine to a first rotational speed by the electric motor, supplying fuel to the engine of which rotational speed has been increased to the first rotational speed, detecting a further increase in the rotational speed of the engine, temporarily stopping a supply of electric power to the electric motor when the further increase in the rotational speed of the engine is not detected, and interrupting the supply of fuel to the engine and resuming the supply of electric power to the electric motor when the rotational speed of the engine decreases to a second rotational speed, and the series of controls is terminated as it is determined that the start of the engine has been completed when the further increase in the rotational speed of the engine has been detected, or when the rotational speed of the engine has not decreased to the second rotational speed.

Further, the engine start control device of the present invention can control the first rotational speed and the second rotational speed to change according to temperature information on the engine.

Further, the engine start control device of the present invention can control the rotational speed and/or a torque of the electric motor when the engine is started to be set variable according to the temperature information on the engine.

For example, the temperature information on the engine is a cooling water temperature of the engine.

Another aspect of the present invention is a hybrid vehicle. The hybrid vehicle of the present invention includes the engine start control device of the present invention.

Further, another aspect of the present invention is an engine start control method. The engine start control method of the present invention is an engine start control method of a hybrid vehicle that includes an engine and an electric motor, that is capable of running by the engine or the electric motor or capable of running by a cooperation between the engine and the electric motor, and that starts the engine by the electric motor, including a first step for increasing a rotational speed of the engine to a first rotational speed by the electric motor, a second step for supplying fuel to the engine of which rotational speed has been increased to the first rotational speed by a process of the first step, and detecting a further increase in the rotational speed of the engine, a third step for temporarily stopping a supply of electric power to the electric motor when the further increase in the rotational speed of the engine is not detected by a process of the second step, a fourth step for interrupting the supply of fuel to the engine and resuming the supply of electric power to the electric motor when the rotational speed of the engine decreases to a second rotational speed by a process of the third step, and a fifth step for determining that the start of the engine has been completed when the further increase in the rotational speed of the engine has been detected by the process of the second step, or when the rotational speed of the engine has not been decreased to the second rotational speed by the process of the third step.

Further, another aspect of the present invention is a computer program. The computer program of the present invention is a computer program for causing an information processing unit to implement a function of the engine start control device of the present invention.

Advantageous Effect of Invention

According to the present invention, it is possible to reduce the electric power consumption when an electric motor starts an engine, and also reduce the time required to start the engine.

DESCRIPTION OF EMBODIMENTS (First Embodiment)

Hereinafter, a hybrid vehicle according to a first embodiment of the present invention will be described with reference to FIGS. 1 to 7.

Figure 1:
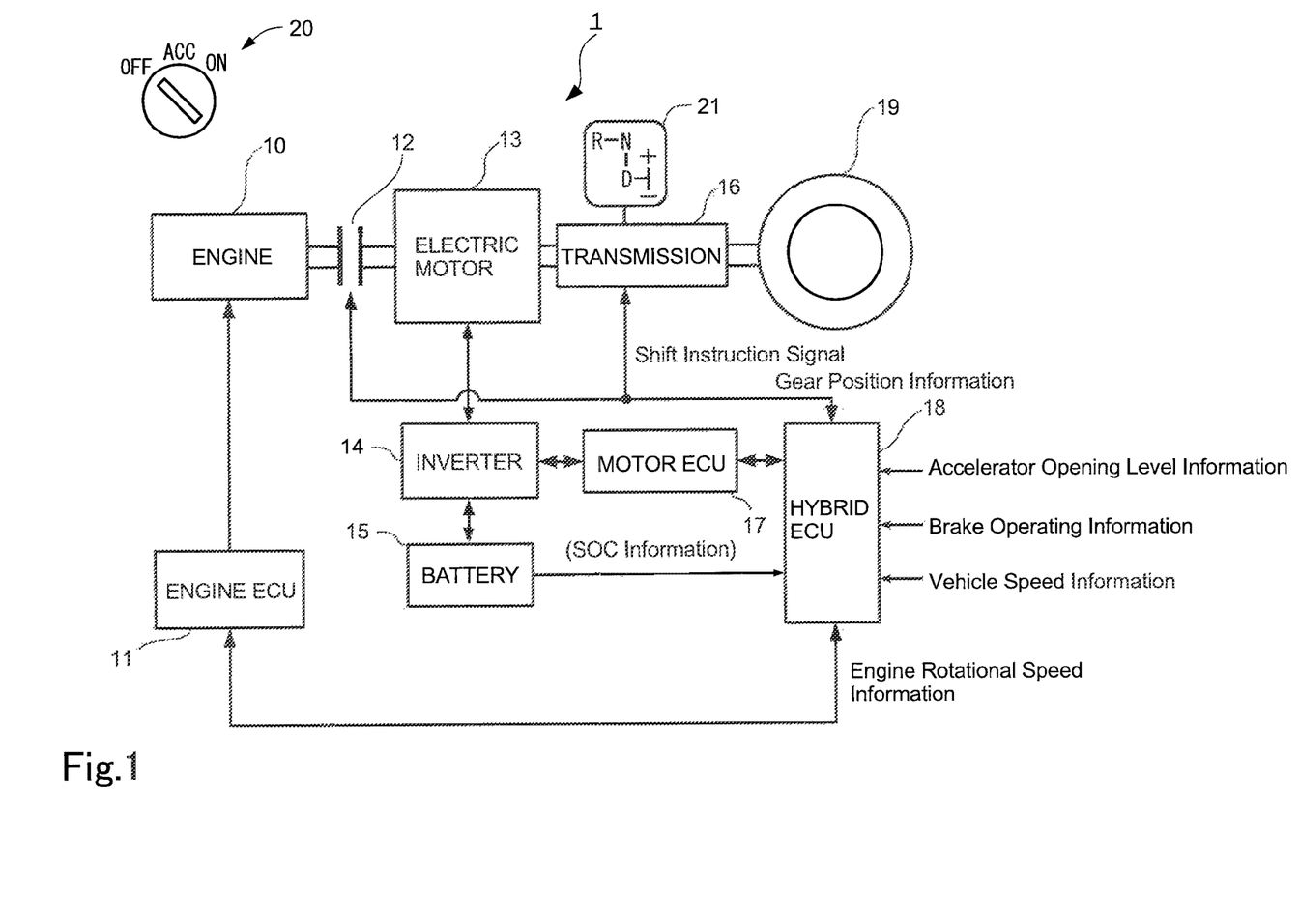
FIG. 1 A block diagram illustrating an exemplary structure of a hybrid vehicle according to a first embodiment of the present invention.

FIG. 1 is a block diagram for illustrating an exemplary structure of a hybrid vehicle 1. The hybrid vehicle 1 is an example of a vehicle. The hybrid vehicle 1 is driven by an engine (internal combustion engine) 10 and/or an electric motor 13 through a transmission that is a semiautomatic transmission. The electric motor 13 can start the engine 10. Note that the semiautomatic transmission is a transmission that can automatically shift the gears while having the same structure as a manual transmission.

The hybrid vehicle 1 includes the engine 10, an engine Electronic Control Unit (ECU) 11, a clutch 12, the electric motor 13, an inverter 14, a battery 15, a transmission 16, a motor ECU 17, a hybrid ECU 18, a wheel 19, a key switch 20, and a shift unit 21. Note that the transmission 16 includes the above-mentioned semiautomatic transmission, and is operated by the shift unit 21 including a drive range (hereinafter, referred to as a D (Drive) range).

The engine 10 is an example of an internal combustion engine, and is controlled by the engine ECU 11. The engine 10 internally combusts gasoline, light oil, Compressed Natural Gas (CNG), Liquefied Petroleum Gas (LPG), alternative fuel, or the like in order to generate power for rotating a shaft and transmit the generated power to the clutch 12.

The engine ECU 11 is a computer working in coordination with the motor ECU 17 according to the instructions from the hybrid ECU 18, and controls the engine 10, for example, the amount of fuel injection and the valve timing. For example, the engine ECU 11 includes a Central Processing Unit (CPU), an Application Specific Integrated Circuit (ASIC), a microprocessor, a Digital Signal Processor (DSP), and the like, and internally has an operation unit, a memory, an Input/Output (I/O) port, and the like.

The clutch 12 is controlled by the hybrid ECU 18, and transmits the shaft output from the engine 10 to the wheel 19 through the electric motor 13 and the transmission 16. In other words, the clutch 12 mechanically connects the rotating shaft of the engine 10 to the rotating shaft of the electric motor 13 by the control of the hybrid ECU 18 in order to transmit the shaft output of the engine 10 to the electric motor 13. On the other hand, the clutch 12 cuts the mechanical connection between the rotating shaft of the engine 10 and the rotating shaft of the electric motor 13 so that the shaft of the engine 10 and the rotating shaft of the electric motor 13 can rotate at different rotational speeds from each other.

For example, the clutch 12 mechanically connects the rotating shaft of the engine 10 to the rotating shaft of the electric motor 13, for example, when the hybrid vehicle 1 runs by the power of the engine 10 and this causes the electric motor 13 to generate electric power, when the driving force of the electric motor 13 assists the engine 10, and when the electric motor 13 starts the engine 10.

Further, for example, the clutch 12 cuts the mechanical connection between the rotating shaft of the engine 10 and the rotating shaft of the electric motor 13 when the engine 10 stops or is in an idling state and the hybrid vehicle 1 runs by the driving force of the electric motor 13, and when the hybrid vehicle 1 reduces the speed or runs on the down grade and the electric motor 13 generates electric power (regenerates electric power) while the engine 10 stops or is in an idling state.

Note that the clutch 12 differs from the clutch operated by the driver's operation of a clutch pedal, and is operated by the control of the hybrid ECU 18.

The electric motor 13 is a so-called motor generator that supplies a shaft output to the transmission 16 by generating the power for rotating the shaft using the electric power supplied from the inverter 14, or that supplies electric power to the inverter 14 by generating the electric power using the power for rotating the shaft supplied from the transmission 16. For example, when the hybrid vehicle 1 gains the speed or runs at a constant speed, the electric motor 13 generates the power for rotating the shaft to supply the shaft output to the transmission 16 in order to cause the hybrid vehicle 1 to run in cooperation with the engine 10. Further, the electric motor 13 works as an electric generator, for example, when the electric motor 13 is driven by the engine 10, or when the hybrid vehicle 1 runs without power, for example, the hybrid vehicle 1 reduces the speed or runs on the down grade. In that case, electric power is generated by the power for rotating the shaft supplied from the transmission 16 and is supplied to the inverter 14 in order to charge the battery 15.

The inverter 14 is controlled by the motor ECU 17, and converts the direct voltage from the battery 15 into an alternating voltage or converts the alternating voltage from the electric motor 13 into a direct voltage. When the electric motor 13 generates power, the inverter 14 converts the direct voltage from the battery 15 into an alternating voltage and supplies the electric power to the electric motor 13. When the electric motor 13 generates electric power, the inverter 14 converts the alternating voltage from the electric motor 13 into a direct voltage. In other words, in that case, the inverter 14 works as a rectifier and a voltage regulator for supplying a direct voltage to the battery 15.

The battery 15 is a secondary cell capable of being charged and discharged. The battery 15 supplies electric power to the electric motor 13 through the inverter 14 when the electric motor 13 generates power. Alternatively, the battery 15 is charged with the electric power generated by the electric motor 13 when the electric motor 13 generates electric power.

The transmission 16 includes a semiautomatic transmission (not shown in the drawings) that selects one of a plurality of gear ratios (change gear ratios) according to a shift instruction signal from the hybrid ECU 18 in order to shift the change gear ratios and transmit the gear-shifted power of the engine 10 and/or of the electric motor 13 to the wheel 19. Alternatively, the transmission 16 transmits the power from the wheel 19 to the electric motor 13, for example, when the vehicle reduces the speed or runs on the down grade. Note that the semiautomatic transmission can also shift the gear position to a given gear number by the driver's hand operation of the shift unit 21.

The motor ECU 17 is a computer working in coordination with the engine ECU 11 according to the instructions from the hybrid ECU 18, and controls the electric motor 13 by controlling the inverter 14. For example, the motor ECU 17 includes a CPU, an ASIC, a microprocessor, a DSP, and the like, and internally has an operation unit, a memory, an I/O port, and the like.

The hybrid ECU 18 is an example of a computer. For hybrid driving, the hybrid ECU 18 obtains accelerator opening information, brake operation information, vehicle speed information, the gear position information obtained from the transmission 16, and the engine rotational speed information obtained from the engine ECU 11 in order to refer to the information, control the clutch 12 and supply the shift instruction in order to control the transmission 16. For hybrid driving, the hybrid ECU 18 further gives the control instructions of the electric motor 13 and the inverter 14 to the motor ECU 17 based on the obtained State of Charge (SOC) information on the battery 15 and other information, and gives the control instruction of the engine 10 to the engine ECU 11. For example, the hybrid ECU 18 includes a CPU, an ASIC, a microprocessor, a DSP, and the like, and internally has an operation unit, a memory, an I/O port, and the like.

Note that a computer program to be executed by the hybrid ECU 18 can be installed on the hybrid ECU 18 that is a computer in advance by being stored in a non-volatile memory inside the hybrid ECU 18 in advance.

The engine ECU 11, the motor ECU 17, and the hybrid ECU 18 are connected to each other, for example, through a bus complying with the standard of the Control Area Network (CAN) or the like.

The wheel 19 is a drive wheel for transmitting the driving force to the road surface. Note that, although only a wheel 19 is illustrated in FIG. 1, the hybrid vehicle 1 actually includes a plurality of the wheels 19.

The key switch 20 is a switch that is turned ON/OFF, for example, by insertion of a key by the user at the start of drive. Turning ON the switch activates each unit of the hybrid vehicle 1, and turning OFF the key switch 20 stops each unit of the hybrid vehicle 1.

Figure 2:
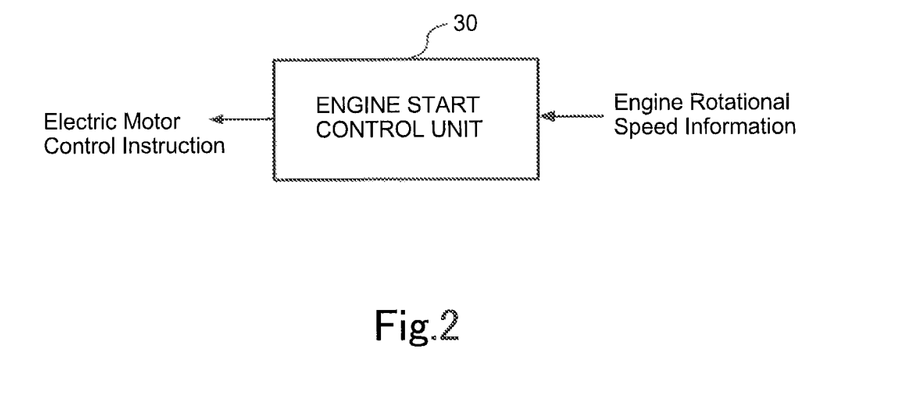
FIG. 2 A block diagram illustrating an exemplary configuration of a function implemented in a hybrid ECU illustrated in FIG. 1.

FIG. 2 is a block diagram for illustrating an exemplary configuration of a function implemented in the hybrid ECU 18 that executes a computer program. In other words, once the hybrid ECU 18 executes a computer program, an engine start control unit 30 is implemented.

The engine start control unit 30 inputs the engine rotational speed information from the engine ECU 11, and outputs an electric motor control instruction to the motor ECU 17.

Next, with reference to the flowchart in FIG. 3, the engine start control process performed in the hybrid ECU 18 executing a computer program will be described. Note that, as situations in which the engine start process is performed, there are a case where the engine 10 is started when the key switch 20 is turned ON at the start of drive of the hybrid vehicle 1, and a case where the engine 10 is started when a condition for stopping idling is removed while the hybrid vehicle 1 is temporarily stopped by an idling stop function (not shown in the drawings) after the hybrid vehicle 1 has already run.

Figure 3:
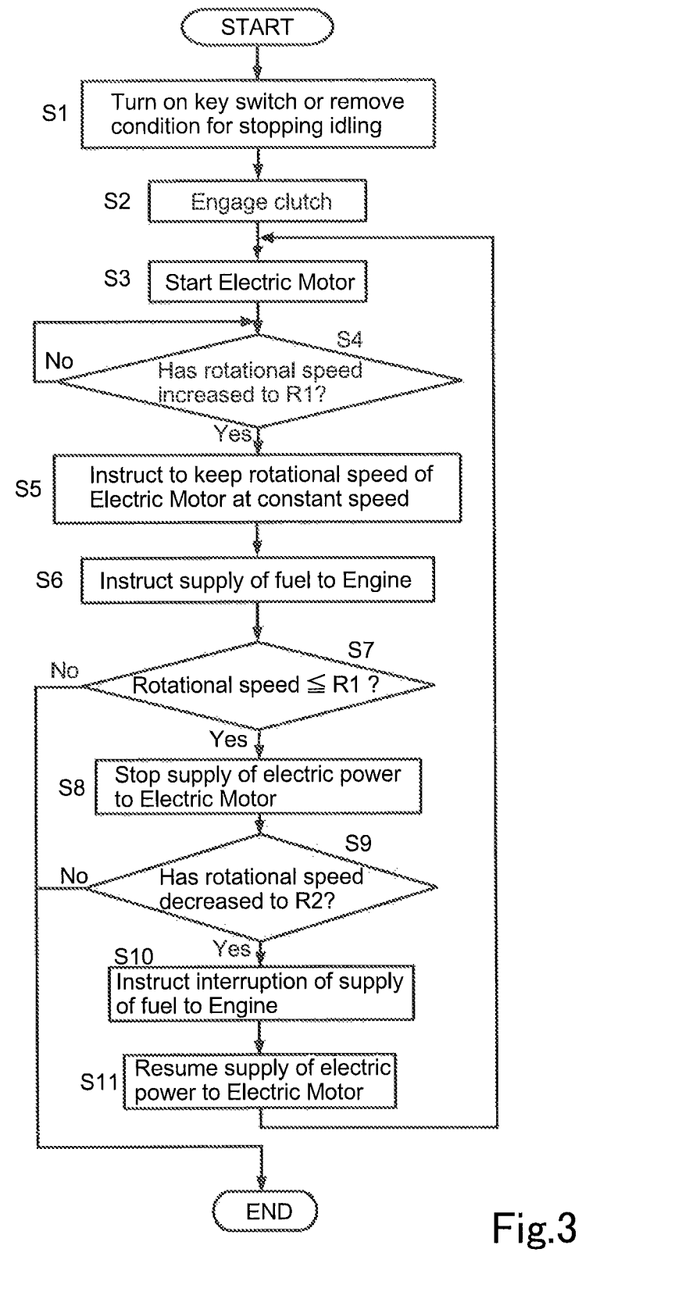
FIG. 3 A flowchart illustrating an engine start process in an engine start control unit illustrated in FIG. 2.

In the "START" illustrated in FIG. 3, the hybrid ECU 18 has executed a computer program and the engine start control unit 30 is implemented by the hybrid ECU 18. Then, the process goes to step S1.

In step S1, when the key switch 20 is turned ON at the start of drive of the hybrid vehicle 1, or when the condition for stopping idling is removed while the hybrid vehicle 1 stops idling after the hybrid vehicle 1 has already run, the engine start control unit 30 recognizes them. Then, the process goes to step S2.

In step S2, the engine start control unit 30 engages the clutch 12, and then the process goes to step S3.

In step S3, the engine start control unit 30 instructs the motor ECU 17 to start the electric motor 13, and then the process goes to step S4.

In step S4, the engine start control unit 30 determines whether the rotational speed of the engine 10 increases to a predetermined rotational speed R1 after the engine 10 that is connected to the electric motor 13 through the clutch 12 is rotated by the torque of the electric motor 13. When it is determined in step S4 that the rotational speed of the engine 10 has increased to the rotational speed R1, the process goes to step S5. Note that it is assumed that the torque of the electric motor 13 when the engine 10 is started is fixed at a predetermined value. It is preferable to set the predetermined value relatively high on the assumption of a situation where it is most difficult to start the engine 10, for example, in winter.

In step S5, the engine start control unit 30 instructs the motor ECU 17 to keep the rotational speed of the electric motor 13 at a constant speed around the rotational speed R1, and then the process goes to step S6.

In step S6, the engine start control unit 30 instructs the engine ECU 11 to supply fuel to the engine 10, and then the process goes to step S7.

In step S7, the engine start control unit 30 determines whether the rotational speed of the engine 10 that is connected to the electric motor 13 through the clutch 12 becomes equal to or less than the rotational speed R1. When it is determined in step S7 that the rotational speed of the engine 10 has been equal to or less than the rotational speed R1, the process goes to step S8. On the other hand, when it is determined in step S7 that the rotational speed of the engine 10 has exceeded the rotational speed R1, it is determined that the start of the engine 10 has succeeded, and the process is terminated.

In step S8, the engine start control unit 30 stops the electric power supplied to the electric motor 13, and then the process goes to step S9.

In step S9, the engine start control unit 30 determines whether the rotational speed of the engine 10 that is connected to the electric motor 13 through the clutch 12 has decreased to a predetermined rotational speed R2 (<R1). When it is determined in step S9 that the rotational speed of the engine 10 has decreased to the rotational speed R2, the process goes to step S10. On the other hand, when it is determined in step S9 that the rotational speed of the engine 10 has not decreased to the rotational speed R2, it means that the start of the engine 10 has succeeded similarly to the case of "No" in step S7 so that the process is terminated. Note that the rotational speed R2 is lower than the rotational speed R1. For example, the proportion of the rotational speed R2 to the rotational speed R1 has been predetermined. In other words, when the value of the rotational speed R1 is determined, in response, the value of the rotational speed R2 is also determined.

In step S10, the engine start control unit 30 instructs the engine ECU 11 to interrupt supplying fuel to the engine 10, and then the process goes to step S11.

In step S11, the engine start control unit 30 resumes supplying electric power to the electric motor 13, and then the process goes back to step S3.

Figure 4:
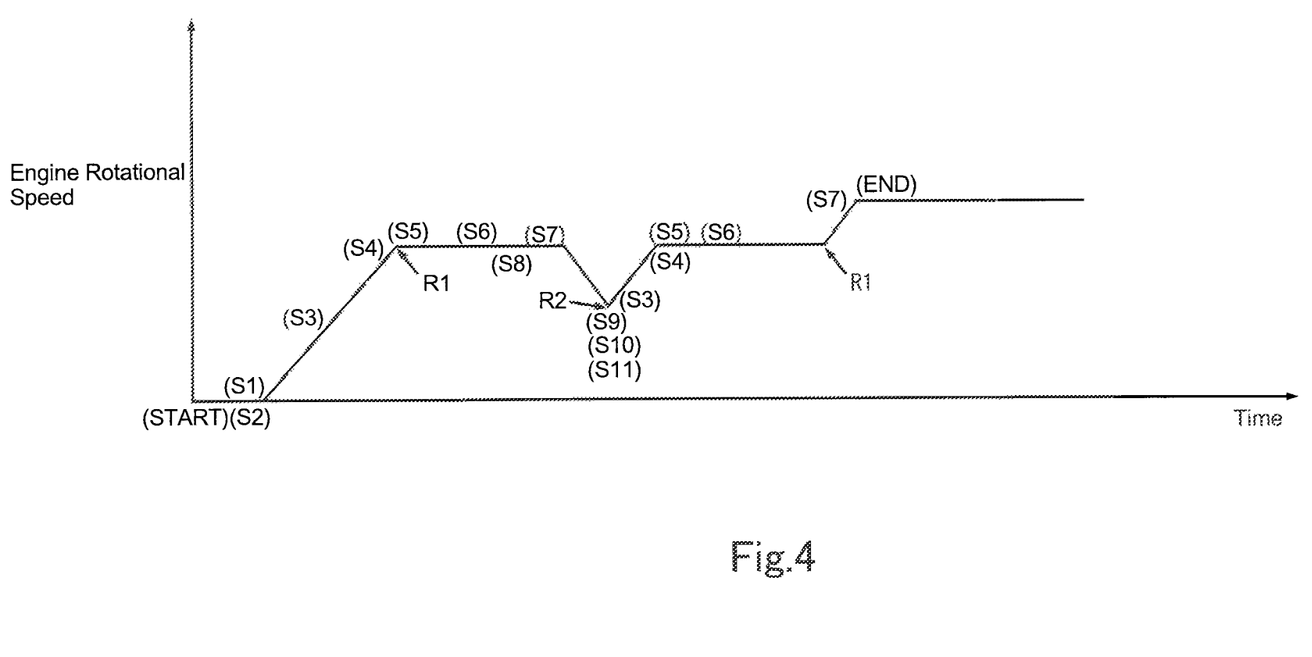
FIG. 4 A view illustrating the variation in the rotational speed of the engine in the engine start operation by the engine start control unit illustrated in FIG. 2.

Next, the variation of the engine rotational speed corresponding to the process of the flow illustrated in FIG. 3 will be described with reference to the time chart illustrated in FIG. 4.

Because the electric motor 13 has not been started from the START to step S2, the rotational speed of the engine 10 has naturally been zero. In step S3, as the electric motor 13 is started, the rotational speed of the engine 10 starts to increase. In step S4, the rotational speed of the engine 10 further continues to increase and reaches the rotational speed R1. In step S5, the rotational speed of the electric motor 13 becomes a constant speed around the rotational speed R1. After that, the rotational speed of the engine 10 also becomes the constant speed. In step S6, fuel is supplied to the engine 10. In step S7, it is determined whether the rotational speed of the engine 10 is equal to or less than the rotational speed R1. In the example, because the start of the engine 10 has been unsuccessful, the rotational speed of the engine 10 does not exceed the rotational speed R1. In step S8, the electric power supplied to the electric motor 13 is stopped. As this causes the rotational speed of the electric motor 13 to start to decrease, the rotational speed of the engine 10 also starts to decrease. In step S9, the rotational speed of the engine 10 decreases to the rotational speed R2. In step S10, when the rotational speed of the engine 10 decreases to the rotational speed R2, the supply of fuel to the engine 10 is interrupted. In step S11, the supply of electric power to the electric motor 13 is resumed, and then the process goes back to step S3.

The process goes back to step S3. As the electric motor 13 is restarted, the rotational speed of the engine 10 starts to increase. In step S4, the rotational speed of the engine 10 further continues to increase and reaches the rotational speed R1. In step S5, the rotational speed of the electric motor 13 becomes a constant speed around the rotational speed R1. After that, the rotational speed of the engine 10 also becomes the constant speed. In step S6, fuel is supplied to the engine 10. In step S7, it is determined whether the rotational speed of the engine 10 is equal to or less than the rotational speed R1. In the example, because the start of the engine 10 has succeeded, the rotational speed of the engine 10 exceeds the rotational speed R1. This completes the start of the engine 10 (END).

(Effect)

In the hybrid vehicle 1, the electric motor 13 increases the rotational speed of the engine 10 to the rotational speed R1, fuel is supplied to the engine 10 of which rotational speed has been increased to the rotational speed R1, and a further increase in the rotational speed of the engine 10 is detected. When the further increase in the rotational speed of the engine 10 is not detected, the supply of electric power to the electric motor 13 is temporarily stopped. When the rotational speed of the engine 10 has decreased to the rotational speed R2, the supply of fuel to the engine 10 is interrupted and the supply of electric power to the electric motor 13 is resumed. When the further increase in the rotational speed of the engine 10 is detected, or when the rotational speed of the engine 10 has not decreased to the rotational speed R2, it is determined that the start of the engine 10 has been completed.

As described above, detecting the variation of the rotational speed of the engine 10 confirms the start of the engine 10. Further, when the start of the engine 10 has been unsuccessful, the process for restarting the engine 10 is performed without decreasing the rotational speed of the engine 10 to zero. This can reduce the electric power consumption when the electric motor 13 starts the engine 10 and also reduce the time required to start the engine 10.

Hereinafter, the effect of the engine start control method according to an embodiment of the present invention will be described in detail in comparison with prior art.

Figure 5:
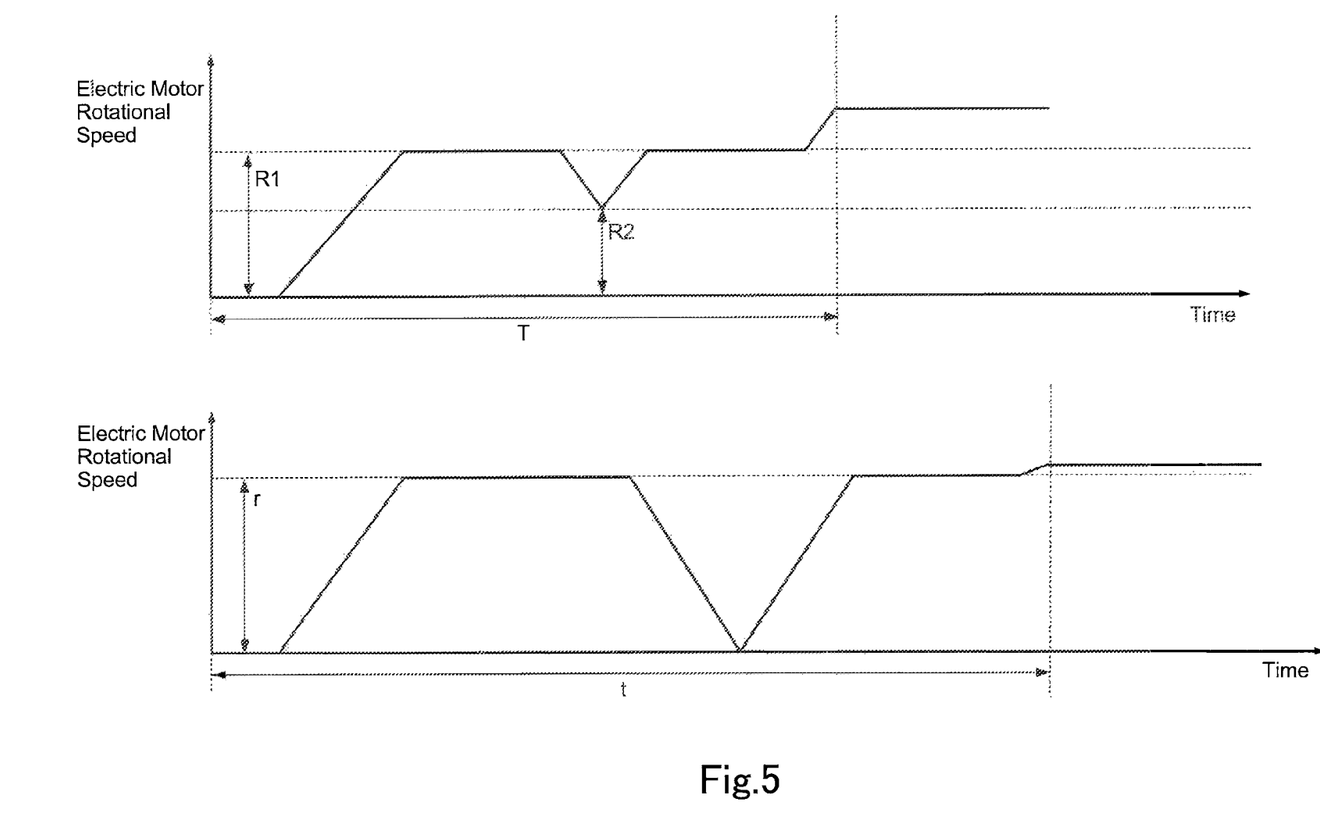
FIG. 5 A view comparing the rotational speed of the electric motor in the engine start operation by the engine start control unit illustrated in FIG. 2 with the rotational speed of the electric motor in the engine start operation in prior art.

In the upper part of FIG. 5, the rotational speed of the electric motor in the engine start method according to an embodiment of the present invention is illustrated together with the time course. In the lower part, the rotational speed of the electric motor in a prior art engine start method is illustrated together with the time course as a comparison example.

As described in FIG. 5, with a view to increasing the success probability of the start of an engine, a rotational speed r of the electric motor 13 for starting the engine 10 in the prior art method is larger in comparison with the embodiment of the present invention (r>R1). Similarly, with a view to increasing the success probability of the start of an engine, the time required to start the engine 10 in the prior art method is longer in comparison with the embodiment of the present invention (t>T). As described above, the engine start method according to the embodiment of the present invention can reduce the electric power consumption when the electric motor 13 starts the engine 10 and also reduce the time required to start the engine 10 in comparison with the past method.

Figure 6:
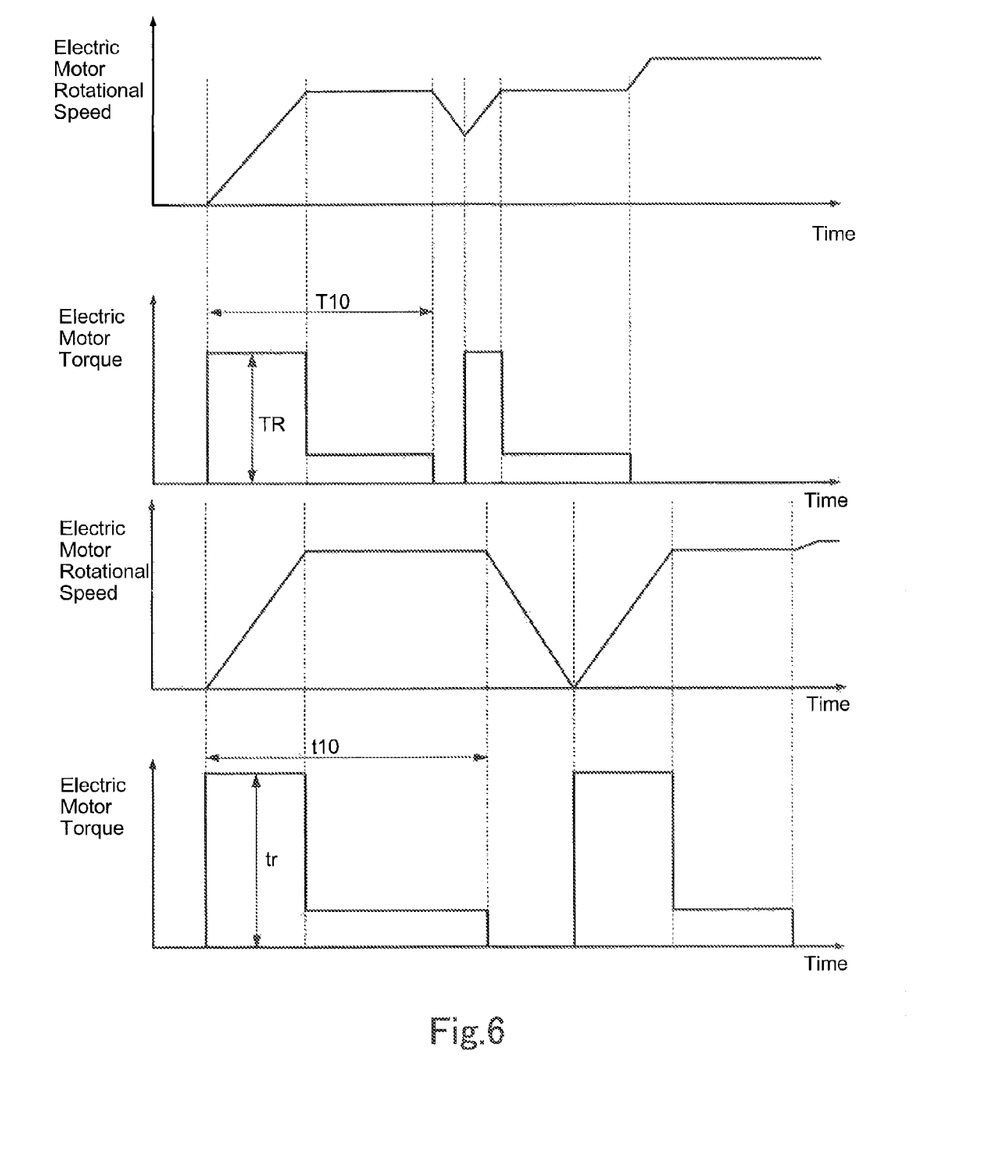
FIG. 6 A view comparing the electric motor torque corresponding to the rotational speed of the electric motor in the engine start operation by the engine start control unit illustrated in FIG. 2 with the electric motor torque corresponding to the rotational speed of the electric motor in the engine start operation in prior art.

Further, at the top of FIG. 6, the rotational speed of the electric motor in the engine start method according to an embodiment of the present invention is illustrated together with the time course. At the second upper part, the electric motor torque in the engine start method according to an embodiment of the present invention is illustrated together with the time course. At the third upper part, the rotational speed of the electric motor in the prior art engine start method is illustrated together with the time course. At the bottom part, the electric motor torque in the prior art engine start method is illustrated together with the time course.

As described in FIG. 6, with a view to increasing the success probability of the start of an engine, a torque tr of the electric motor 13 for starting the engine 10 in the prior art method is larger in comparison with the embodiment of the present invention (tr>TR). Similarly, with a view to increasing the success probability of the start of an engine, a time t10 required to start the engine 10 in the prior art method is longer in comparison with the embodiment of the present invention (t10>T10). As described above, the engine start method according to the embodiment of the present invention can reduce the electric power consumption when the electric motor 13 starts the engine 10 and also reduce the time required to start the engine 10 in comparison with the past method.

Figure 7:
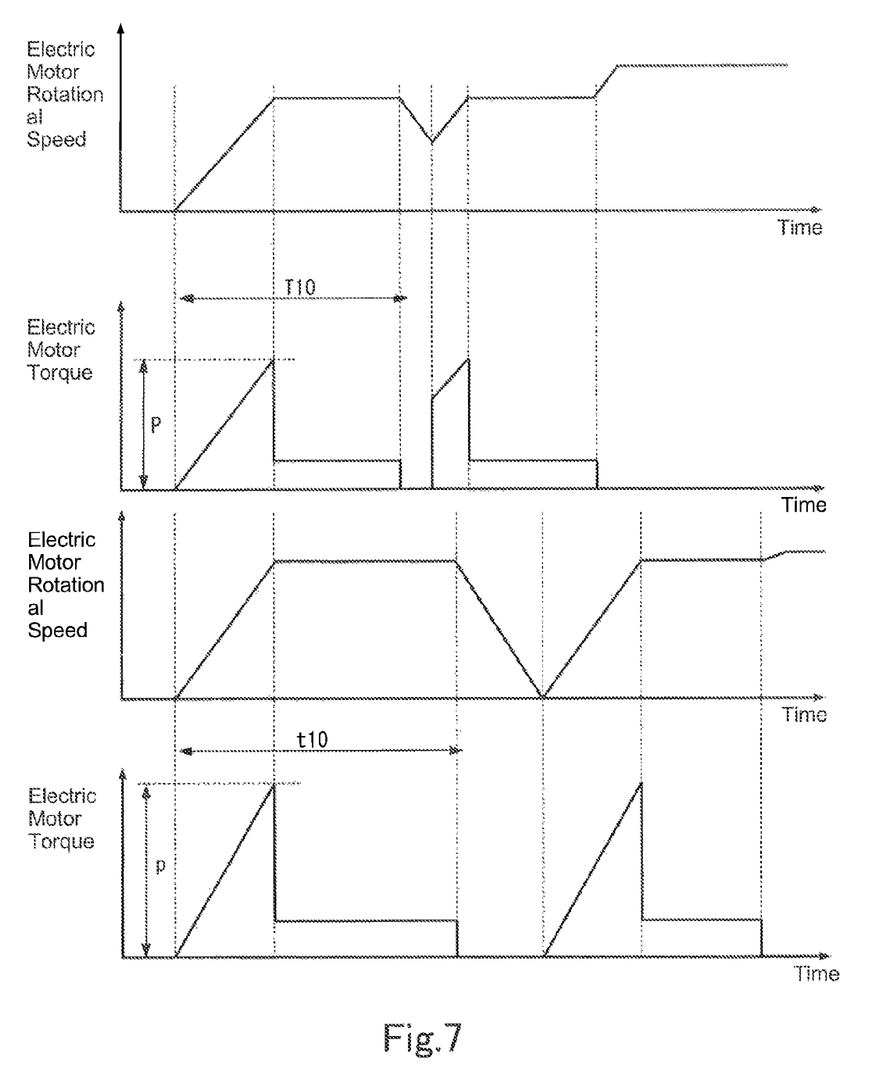
FIG. 7 A view comparing the electric motor output corresponding to the rotational speed of the electric motor in the engine start operation by the engine start control unit illustrated in FIG. 2 with the electric motor output corresponding to the rotational speed of the electric motor in the engine start operation in prior art.

Further, at the top of FIG. 7, the rotational speed of the electric motor in the engine start method according to an embodiment of the present invention is illustrated together with the time course. At the second upper part, the electric motor output in the engine start method according to an embodiment of the present invention is illustrated together with the time course. At the third upper part, the rotational speed of the electric motor in the prior art engine start method is illustrated together with the time course. At the bottom part, the electric motor output in the prior art engine start method is illustrated together with the time course.

As described in FIG. 7, with a view to increasing the success probability of the start of an engine, an output p of the electric motor 13 for starting the engine 10 in the prior art method is larger in comparison with the embodiment of the present invention (p>P). Similarly to FIG. 6, with a view to increasing the success probability of the start of an engine, the time t10 required to start the engine 10 in the prior art method is longer in comparison with the embodiment of the present invention (t10>T10). As described above, the engine start method according to the embodiment of the present invention can reduce the electric power consumption when the electric motor 13 starts the engine 10 and also reduce the time required to start the engine 10 in comparison with the past method.

(Second Embodiment)

Hereinafter, a hybrid vehicle 1A according to a second embodiment of the present invention will be described with reference to FIGS. 8 to 15. In the hybrid vehicle 1A, rotational speeds R1 and R2, and a torque of an electric motor 13 that are used for the start control of an engine 10 and that are fixedly set at the engine start control unit 30 in the hybrid vehicle 1 are variable based on the cooling water temperature information of a radiator 22. Note that the rotational speed R2 is lower than the rotational speed R1, and the proportion of the rotational speed R2 to the rotational speed R1 has been predetermined. Thus, determining the value of the rotational speed R1 automatically determines the value of the rotational speed R2.

In other words, although the values of the rotational speeds R1 and R2 have been described as fixed values in the first embodiment, the values of the rotational speeds R1 and R2 are set as variable values in the second embodiment. In the second embodiment, the values of the rotational speeds R1 and R2 are variable according to the cooling water temperature of the radiator 22. In that case, the rotational speeds R1 and R2 are set lower because it is easy to start the engine 10 when the cooling water temperature is shown as a relatively high temperature. In the contrary, the rotational speeds R1 and R2 are set higher because it is difficult to start the engine 10 when the cooling water temperature is shown as a relatively low temperature.

Further, the torque of the electric motor 13 when the engine 10 is started is also set lower because it is easy to start the engine 10 when the cooling water temperature is shown as a relatively high temperature. In the contrary, the torque is set higher because it is difficult to start the engine 10 when the cooling water temperature is shown as a relatively low temperature.

Figure 8:
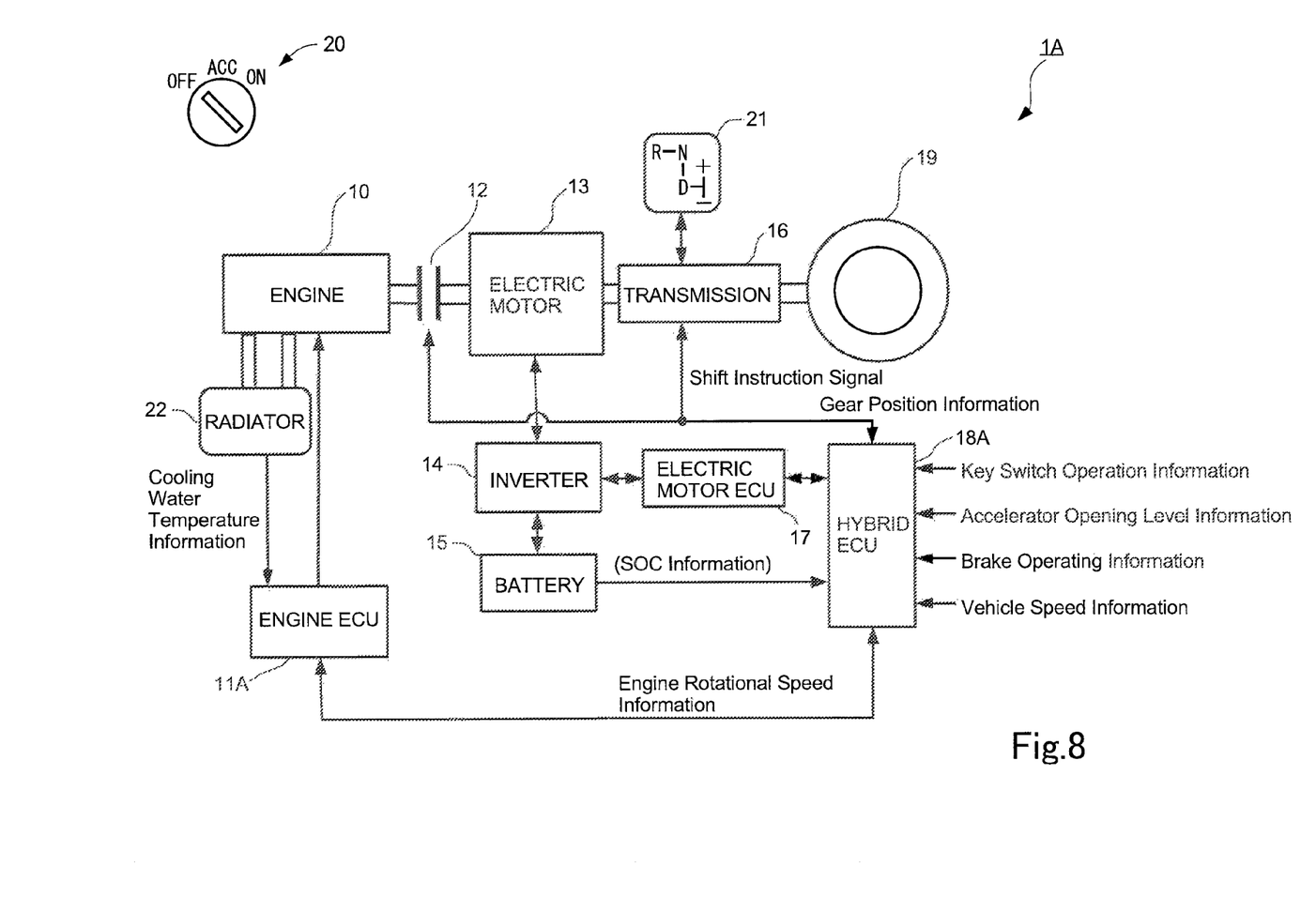
FIG. 8 A block diagram illustrating an exemplary configuration of a hybrid vehicle according to a second embodiment of the present invention.

FIG. 8 is a block diagram for illustrating an exemplary structure of the hybrid vehicle 1A. The structure of the hybrid vehicle 1A partially differs from the structure of the hybrid vehicle 1. In the hybrid vehicle 1A, a hybrid ECU 18A can receive the cooling water temperature information of the radiator 22 through an engine ECU 11A. Further, the hybrid ECU 18A performs a control based on the operation information of the key switch 20. Because the other components in the hybrid vehicle 1A are the same as those of the hybrid vehicle 1, the descriptions are omitted.

Figure 9:
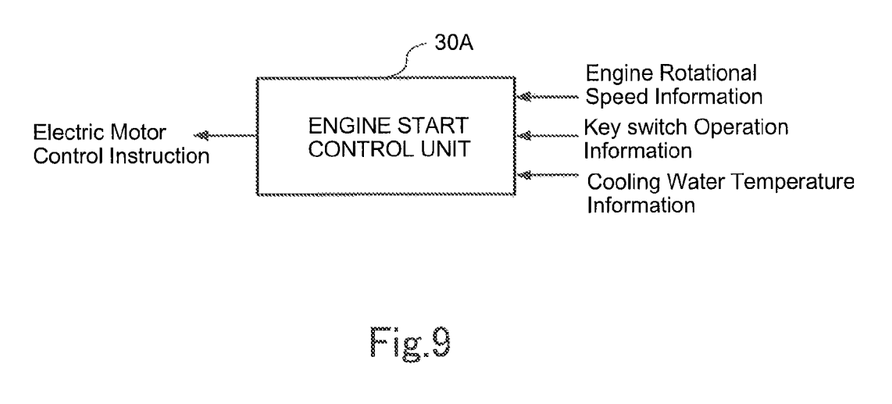
FIG. 9 A block diagram for illustrating an exemplary configuration of a function implemented in a hybrid ECU illustrated in FIG. 8.

FIG. 9 is a block diagram for illustrating an exemplary configuration of a function implemented in a hybrid ECU 18A executing a computer program. In other words, once the hybrid ECU 18A executes a computer program, a function of an engine start control unit 30A (referred to as an engine start control device in the appended claims) is implemented.

The engine start control unit 30A instructs the engine ECU 11, a clutch 12, and an electric motor ECU 17 to control the engine start based on key switch operation information and the cooling water temperature information in addition to the engine rotational speed information.

Next, the relationship between a target starting rotational speed of the electric motor 13 and the cooling water temperature will be described with reference to FIG. 10, and the relationship between a target starting torque of the electric motor 13 and the cooling water temperature will be described with reference to FIG. 11. In that case, the target starting rotational speed denotes a target rotational speed of the electric motor 13 when the electric motor 13 starts the engine 10. The target starting rotational speed corresponds to the rotational speed R1 in the first embodiment. Further, the target starting torque denotes a target torque of the electric motor 13 when the electric motor 13 starts the engine 10. While the torque of the electric motor 13 is constant in the first embodiment, the torque is set at the target starting torque in the second embodiment.

Figure 10:
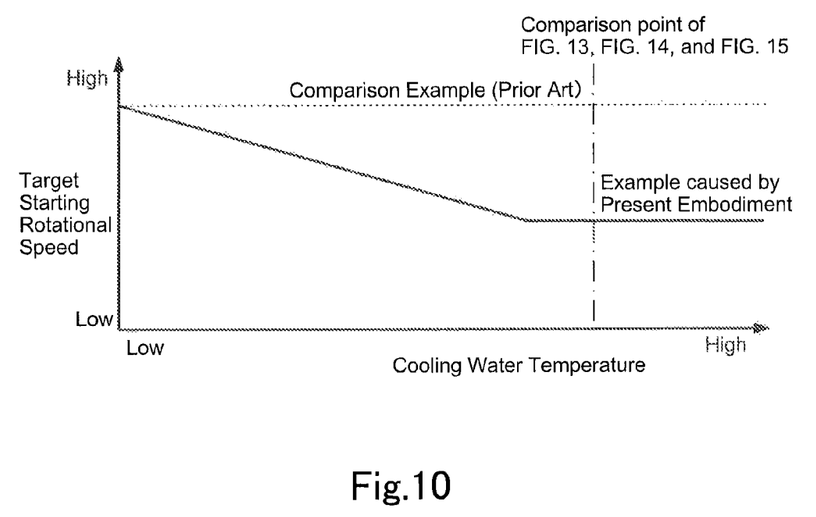
FIG. 10 A view illustrating the relationship between a target starting rotational speed of the electric motor and a cooling water temperature.

In FIG. 10, the cooling water temperature is shown on the horizontal axis, and the target starting rotational speed is shown on the vertical axis. In FIG. 11, the cooling water temperature is shown on the horizontal axis, and the target starting torque is shown on the vertical axis. As shown with the solid line in FIG. 10, whereas the target starting rotational speed is set high when the cooling water temperature is low, the target starting rotational speed is set low when the cooling water temperature is high.

Figure 11:
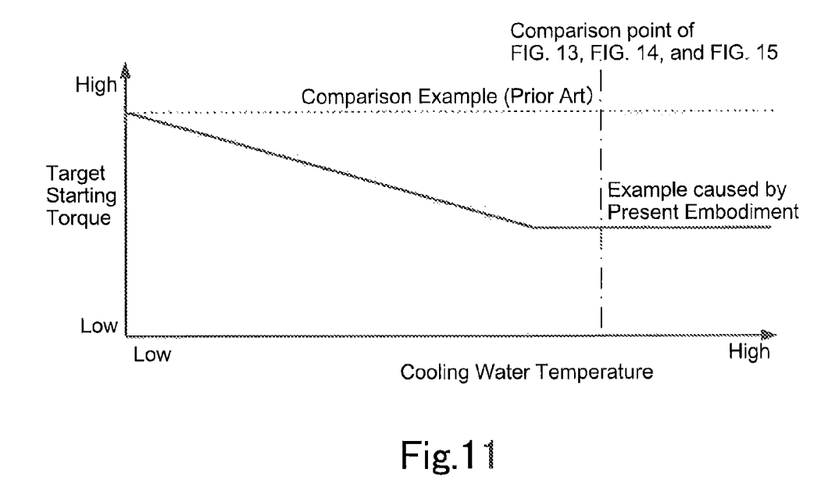
FIG. 11 A view illustrating the relationship between a target starting torque of the electric motor and a cooling water temperature.

Further, as shown with the solid line in FIG. 11, whereas the target starting torque is set high when the cooling water temperature is low, the target starting torque is set low when the cooling water temperature is high. Note that the comparison examples (prior art) are shown as dashed lines in FIGS. 10 and 11. In the comparison examples (prior art), the target starting rotational speed and the target starting torque are set at high values, respectively, on the assumption of the case where it is most difficult to start the engine 10 (the cooling water temperature is lowest).

Next, an engine start control process performed in the hybrid ECU 18A executing a computer program will be described with reference to the flowchart illustrated in FIG. 12. Note that the flow from step S20 to step S23 in FIG. 12 is a cycle of the process, and is repeatedly performed as long as a key switch 20 is the ON state.

Figure 12:
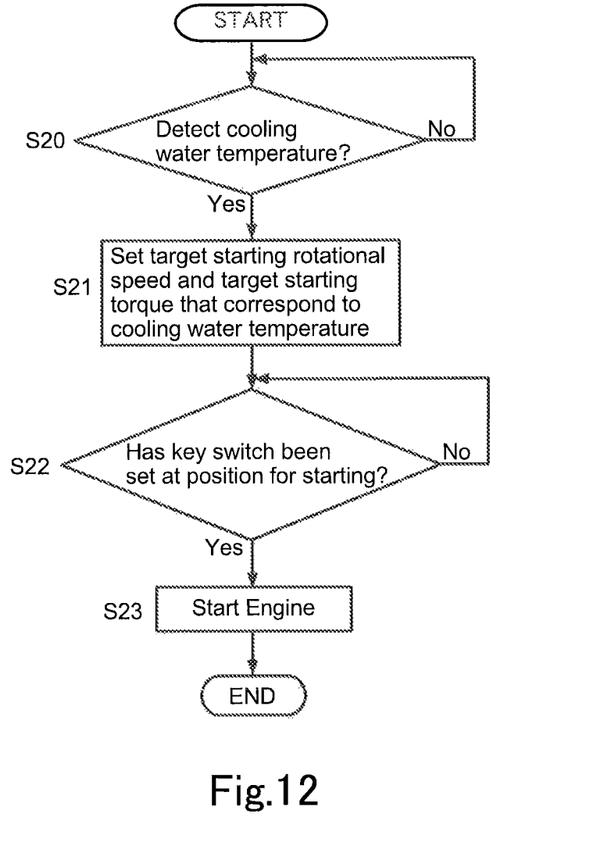
FIG. 12 A flowchart illustrating a process in the engine start control unit illustrated in FIG. 9.

In the "START" illustrated in FIG. 12, the key switch 20 is the ON state, the hybrid ECU 18A has executed a computer program, and a function of the engine start control unit 30A is implemented by the hybrid ECU 18A. Then, the process goes to step S20.

In step S20, the engine start control unit 30A determines whether the cooling water temperature information transmitted from the radiator 22 through the engine ECU 11A has been detected. When it is determined in step S20 that the cooling water temperature information has been detected, the process goes to step S21. On the other hand, when it is determined in step S20 that the cooling water temperature has not been detected, step S20 in the process is repeated.

In step S21, the engine start control unit 30A sets a target starting rotational speed (namely, the rotational speed R1) and a target starting torque that correspond to the cooling water temperature detected in step S20, and then the process goes to step S22.

In step S22, the engine start control unit 30A determines whether the key switch 20 has been set at the position for starting the engine 10. When it is determined in step S22 that the key switch 20 has been set at the position for starting the engine 10, the process goes to step S23. On the other hand, when it is determined in step S22 that the key switch 20 has not been set at the position for starting the engine 10, step S22 in the process is repeated.

In step S23, the engine start control unit 30A causes the electric motor 13 to start the engine 10, and the process is completed (END).

(Effect)

The effect according to the second embodiment of the present invention will be described with reference to FIGS. 13, 14, and 15. Note that the examples in FIGS. 13, 14, and 15 show the states in that the start of the engine 10 has succeeded in the shortest time after the "No" in step S7 of the flowchart illustrated in FIG. 3 at the first embodiment.

Figure 13:
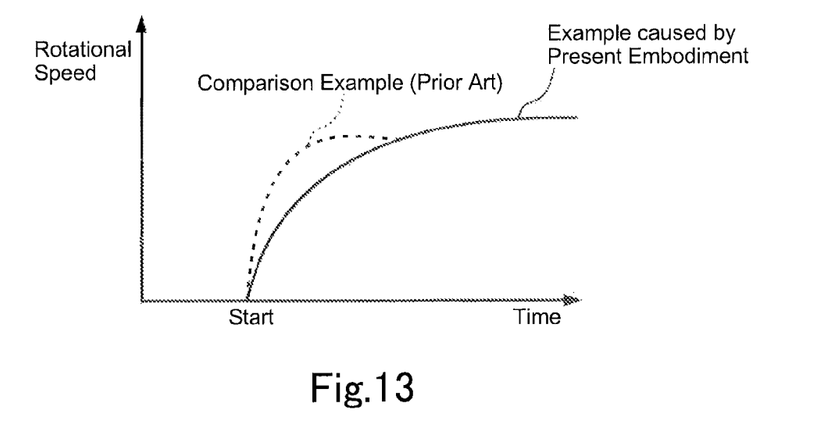
FIG. 13 A view illustrating, together with a comparison example, the state of the rotational speed at the start of the electric motor when the engine start control unit illustrated in FIG. 9 starts the engine.

In FIG. 13, the time course is shown on the horizontal axis, and the rotational speed of the electric motor 13 is shown on the vertical axis. The solid line of FIG. 13 shows the rotational speed of the electric motor 13 at the start of the engine 10 by the control of the engine start control unit 30A. The dashed line shows the rotational speed of the electric motor 13 at the start of the engine 10 in prior art as a comparison example. Note that FIGS. 13, 14, and 15 illustrate the comparisons between the comparison examples (prior art) and the examples of the embodiment of the present invention at the positions that are in the region where the cooling water temperature is high and that are indicated by alternate long and short dashed lines in FIGS. 10 and 11. From this, it is found that the rotational speed in prior art is larger at the start in comparison with the example of the embodiment of the present invention as shown in FIG. 13 because the target starting rotational speed and the target starting torque are set lower than those of the case in prior art at the examples in FIGS. 10 and 11.

Figure 14:
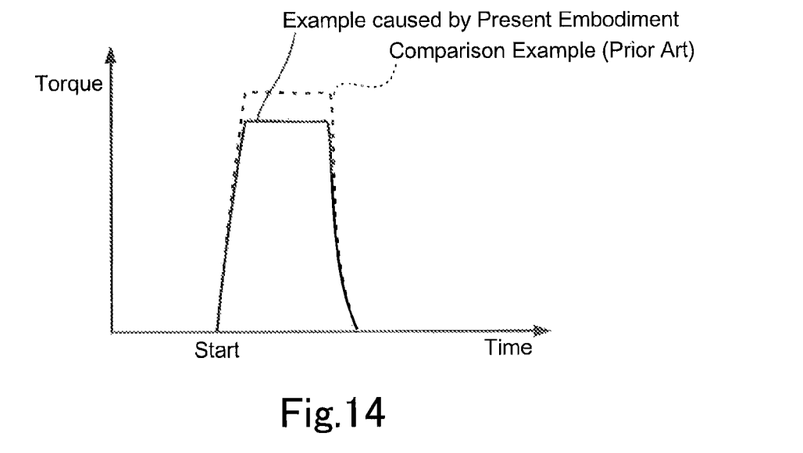
FIG. 14 A view illustrating, together with a comparison example, the state of the torque at the start of the electric motor when the engine start control unit illustrated in FIG. 9 starts the engine.

In FIG. 14, the time course is shown on the horizontal axis, and the torque of the electric motor 13 is shown on the vertical axis. The solid line in FIG. 14 denotes the torque of the electric motor 13 at the start of the engine 10 by the control of the engine start control unit 30A, and the dashed line denotes the torque of the electric motor 13 at the start of the engine 10 in prior art as a comparison example. From this, it is found that the torque in prior art is larger at the start in comparison with the example of the embodiment of the present invention as shown in FIG. 14 because the target starting rotational speed and the target starting torque are set lower than those of the case in prior art at the examples in FIGS. 10 and 11.

Figure 15:
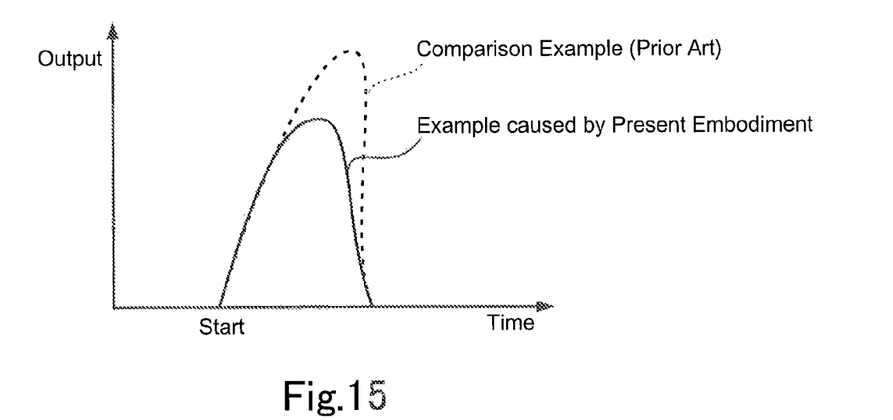
FIG. 15 A view illustrating, together with a comparison example, the state of the output at the start of the electric motor when the engine start control unit illustrated in FIG. 9 starts the engine.

Similarly, in FIG. 15, the time course is shown on the horizontal axis, and the output of the electric motor 13 is shown on the vertical axis. The solid line in FIG. 15 denotes the output of the electric motor 13 at the start of the engine 10 by the control of the engine start control unit 30A, and the dashed line denotes the output of the electric motor 13 at the start of the engine 10 in prior art as a comparison example. From this, it is found that the output in prior art is larger at the start in comparison with the example of the embodiment of the present invention as shown in FIG. 15 because the target starting rotational speed and the target starting torque are set lower than those of the case in prior art at the examples in FIGS. 10 and 11.

As described above, the target starting rotational speed (namely, the rotational speed R1) and target starting torque of the electric motor 13 when the engine 10 is started are set variable according to the cooling water temperature of the engine 10 so that the electric power consumption required to start the engine 10 can be reduced.

This can create the synergy between the effect in that "the electric power consumption when the electric motor 13 starts the engine 10 can be reduced, and the time required to start the engine 10 can also be reduced" in the first embodiment and the effect in that "the electric power consumption required to start the engine 10 can be reduced" in the second embodiment. Thus, a time-efficient and energy-efficient start control of the engine 10 can be implemented according to the temperature environment before the start of the engine 10.

(Other Embodiments)

In the above-mentioned second embodiment, the engine start control unit 30A detects the cooling water temperature of the radiator 22 in order to perform a start control because it is most advantageous to use a cooling water temperature indicator of the radiator 22 since a vehicle in prior art necessarily has the cooling water temperature indicator. However, if the hybrid vehicle 1A has any other means to obtain temperature information, for example, on the temperature of the chassis of the engine 10, the temperature of the engine room, or the temperature of the engine oil, the engine start control unit 30A can perform a start control using one of the temperature information.

Alternatively, if the hybrid vehicle 1A has a clock function further capable of indicating a calendar (date), the engine start control unit 30A can perform a start control by properly setting the target starting rotational speed and the target starting torque according to season information and time information, for example, indicating whether it is a cold night or a warm day without depending on the direct temperature information since the clock function indicates the season (spring, summer, autumn, and winter). Alternatively, for example, the driver can input the season information, the time information or the like by hand.

Further, although the above-mentioned embodiment has described an example in which the engine start control unit 30A sets both of the target starting rotational speed and target starting torque of the electric motor 13 according to the cooling water temperature of the radiator 22, the engine start control unit 30A can set one of the target starting rotational speed and target starting torque of the electric motor 13 according to the cooling water temperature of the radiator 22.

For example, prior experiments in which various temperature conditions are set can confirm how much torque is required to rotate the shaft of the engine 10 at each of the temperature conditions in order to reach the rotational speed capable of starting the engine 10. Based on the results from such experiments, only the target starting torque of the electric motor 13 can be set according to the cooling water temperature of the radiator 22 in advance. Alternatively, it is not necessary to set the target starting torque in advance if the torque of the electric motor 13 is controlled to gradually be increased until the rotational speed reaches the target starting rotational speed during the actual start in order to control to finally reach the target starting rotational speed while only the target starting rotational speed of the electric motor 13 is set according to the cooling water temperature of the radiator 22 in advance.

While the computer program executed by the hybrid ECUs 18 and 18A is installed on the hybrid ECUs 18 and 18A in advance in the description above, the computer program can be installed on the hybrid ECUs 18 and 18A as a computer by attaching removable media recording the computer program (storing the computer program), for example, to a drive (not shown in the drawings) and storing the computer program read from the removable media in a non-volatile memory inside the hybrid ECUs 18 and 18A, or receiving, by a communication unit (not shown in the drawings), a computer program transmitted through a wired or wireless transmission medium and storing the computer program in a non-volatile memory inside the hybrid ECUs 18 and 18A.

Further, each ECU can be implemented by an ECU combining each of the ECUs. Alternatively, an ECU can newly be provided by the subdivision of the function of each ECU.

Note that the computer program executed by the computer can be for performing the process in chronological order according to the order described herein or can be for performing the process in parallel or at the necessary timing, for example, when the computer program is invoked.

Further, the boundaries of the region for determination can variously be changed, for example, the "equal to or more than" can be changed into "exceeds" and the "less than" can be changed into "equal to or less than" in the description of the above-mentioned flowchart.

Although the engine 10 has been described as an internal combustion engine, the engine 10 can also be a heat engine including an external combustion engine.

Further, the embodiments of the present invention are not limited to the above-mentioned embodiments, and can be variously modified without departing from the gist of the invention.

The invention claimed is:

1. An engine start control device of a hybrid vehicle that includes an engine and an electric motor, that is capable of running by the engine or the electric motor or capable of running by a cooperation between the engine and the electric motor, and that starts the engine by the electric motor,
wherein a series of controls is repeatedly performed and the series of controls includes increasing a rotational speed of the engine to a first rotational speed by the electric motor, supplying fuel to the engine of which rotational speed has been increased to the first rotational speed, detecting a further increase in the rotational speed of the engine, temporarily stopping a supply of electric power to the electric motor when the further increase in the rotational speed of the engine is not detected, and interrupting the supply of fuel to the engine and resuming the supply of electric power to the electric motor when the rotational speed of the engine decreases to a second rotational speed, and
the series of controls is terminated as it is determined that the start of the engine has been completed when the further increase in the rotational speed of the engine has been detected, or when the rotational speed of the engine has not decreased to the second rotational speed.

2. The engine start control device according to claim 1, wherein the first rotational speed and the second rotational speed are controlled to change according to temperature information on the engine.

3. The engine start control device according to claim 2, wherein a rotational speed and/or a torque of the electric motor when the engine is started are/is controlled to be set variable according to the temperature information on the engine.

4. The engine start control device according to claim 3, wherein the temperature information on the engine is a cooling water temperature of the engine.

5. The engine start control device according to claim 2, wherein the temperature information on the engine is a cooling water temperature of the engine.

6. A hybrid vehicle comprising the engine start control device according to claim 1.

7. An engine start method of a hybrid vehicle that includes an engine and an electric motor, that is capable of running by the engine or the electric motor or capable of running by a cooperation between the engine and the electric motor, and that starts the engine by the electric motor, comprising:
a first step of increasing a rotational speed of the engine to a first rotational speed by the electric motor;
a second step of supplying fuel to the engine of which rotational speed has been increased to the first rotational speed by a process of the first step, and detecting a further increase in the rotational speed of the engine;
a third step of temporarily stopping a supply of electric power to the electric motor when the further increase in the rotational speed of the engine is not detected by a process of the second step;
a fourth step of interrupting the supply of fuel to the engine and resuming the supply of electric power to the electric motor when the rotational speed of the engine decreases to a second rotational speed by a process of the third step; and
a fifth step of determining by a processor that the start of the engine has been completed when the further increase in the rotational speed of the engine has been detected by the process of the second step, or when the rotational speed of the engine has not been decreased to the second rotational speed by the process of the third step.

8. A non-transitory computer readable medium having a computer program for causing an information processing unit to implement a function of the engine start control device according to claim 1.

* * * * *